United States Patent
Kessler

(10) Patent No.: US 7,716,449 B2
(45) Date of Patent: May 11, 2010

(54) EFFICIENT CHUNKED JAVA OBJECT HEAPS

(75) Inventor: Peter B. Kessler, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 370 days.

(21) Appl. No.: 11/827,940

(22) Filed: Jul. 12, 2007

(65) Prior Publication Data

US 2009/0019221 A1 Jan. 15, 2009

(51) Int. Cl.
G06F 12/00 (2006.01)

(52) U.S. Cl. .................. 711/170; 711/202; 711/207

(58) Field of Classification Search ............... 711/170, 711/202, 203, 207, 154

See application file for complete search history.

(56) References Cited

U.S. PATENT DOCUMENTS

| | | | | |
|---|---|---|---|---|
| 5,706,461 | A * | 1/1998 | Branstad et al. | 711/203 |
| 6,216,200 | B1 * | 4/2001 | Yeager | 711/100 |
| 6,530,017 | B1 * | 3/2003 | Dice et al. | 712/242 |
| 6,880,065 | B1 | 4/2005 | Roux | |
| 6,928,460 | B2 | 8/2005 | Nagarajan et al. | |
| 2002/0108025 | A1 * | 8/2002 | Shaylor | 711/203 |
| 2006/0064564 | A1 | 3/2006 | Achanta et al. | |
| 2006/0190552 | A1 * | 8/2006 | Henze et al. | 709/216 |

FOREIGN PATENT DOCUMENTS

WO 2008017204 A1 2/2008

OTHER PUBLICATIONS

ADL-Tabatabai et al., "Improving 64-Bit Java IPF Performance by Compressing Heap References", Proceedings of the International Symposium on Code Generation and Optimization (CGO 2004), IEEE, Apr. 2004, ISBN: 0-7695-2102-9, 11 pages.

Lattner et al., "Transparent Pointer Compression for Linked Data Structures", ACM Proceedings of the 2005 workshop on Memory system performance, Jun. 2005, ISBN: 1-59593-147-3, 12 pages.

European Search Report Issued in 08252327.5, Dated Aug. 26, 2009 (2 Pages).

European Search Opinion Issued in 08252327.5, Dated Aug. 26, 2009 (3 Pages).

Martinot, Lidwine, "Dynamic Memory Allocation Optimizes Integration of Blackfin Processor Software", Analog Dialogue, Analog Devices, Norwood, MA, US, vol. 37, No. 3, Jul. 1, 2003, pp. 1-5, XP007908380, ISSN: 0161-3626 *Abstract* (5 Pages).

* cited by examiner

*Primary Examiner*—Pierre-Michel Bataille
(74) *Attorney, Agent, or Firm*—Osha • Liang LLP

(57) ABSTRACT

A mechanism is disclosed for offset-based addressing in the chunks of a chunked heap. The mechanism provides for storing a side data structure within a portion of a chunk, where the side data structure begins at a predetermined offset within the range of virtual memory addresses allocated to the chunk. The side data structure comprises a plurality of entries, where each entry is associated with a corresponding section of the chunk. The mechanism provides for locating a particular entry in the side data structure corresponding to a particular section of the chunk by using the predetermined offset and an index derived based on the particular section, where locating the particular entry does not include performing any memory accessing operations or conditional branch operations to obtain an indirect reference to the side data structure.

20 Claims, 8 Drawing Sheets

EFFICIENT CHUNKED JAVA OBJECT HEAPS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When an Operating System (OS) initializes a process for execution, the OS assigns to the process a memory address space which begins at virtual address 0x0 and which may go up to the maximum memory address space that the particular OS can assign to a process. The memory address space assigned to a process is a virtual memory address space which, during the execution of the process, is mapped by the OS to physical memory address space. (The physical memory address space used by a process during the process' execution typically does not begin at physical address 0x0.) For example, the virtual memory address space of a process may be divided into virtual memory pages that are mapped by the OS to physical memory pages. When a process is executing (i.e. during the runtime of a process), the OS also maps virtual addresses used by the process to the corresponding physical addresses in the physical memory. For example, when a process requests to access data at a particular virtual memory address, the OS translates the particular virtual memory address to the physical address in physical memory where the requested data is located.

When a process starts up, the process typically includes in its virtual memory address space all the executable code of the process and all other data needed by the process. Examples of process data include, but are not limited to, heaps, stacks, and other permanent or temporary data structures. In addition, a process may provide one or more components for managing the virtual memory address space assigned thereto and for dynamically allocating virtual memory when needed (e.g., by making calls to a malloc( ) function that is included in a C runtime library).

One example of a process is a Java Virtual Machine (JVM). A JVM process would typically provide one or more threads that are operable to manage the virtual memory address space of the JVM, for example, garbage collectors and other memory management threads. In current JVM implementations, JVM processes are operable to use contiguous heaps. For example, when a JVM process starts, the JVM process would typically allocate an object heap as a range of contiguous virtual memory addresses, where the size of the range is a parameter that may be pre-configured by a user or set by the JVM process itself. As used herein, "heap" refers to a portion of virtual memory that is managed by the process associated therewith. "Object heap" refers to a heap that is operable to store objects, which are any entities that may be instantiated by a process.

Contiguous heaps are widely used in process implementations because they allow for offset-based indexing into side data structures, which are used to manage the heaps and any information stored therein. (As used herein, "side data structure" refers to a portion of virtual memory that stores metadata information about a heap.) For example, a JVM process may use one or more side data structures to facilitate traversals and garbage collection of the objects stored in a contiguous heap.

The use of contiguous heaps, however, has some disadvantages. One disadvantage is that once a process allocates a contiguous heap (usually at start-up), the process cannot thereafter dynamically increase or decrease the size of the heap. This disadvantage is serious because the process cannot utilize its virtual memory address space efficiently. For example, if a process allocates a contiguous heap that is too big, the process may run out of virtual memory when it attempts to allocate memory for non-heap data. If a process allocates a contiguous heap that is too small, the process may not have enough heap space for the heap data that it needs during execution. This disadvantage is exacerbated for processes (e.g. servers and JVMs) that may need to run for relatively long periods of time under uneven workloads.

To address this disadvantage of contiguous heaps, some process implementations may use chunked heaps. (As used herein, "chunked heap" refers to a heap that comprises a plurality of chunks, which chunks are not allocated in a contiguous range of virtual memory addresses.) For example, a process may allocate the chunks of a chunked heap only when heap space is needed, and may de-allocate any heap chunks that are no longer needed. In this way, a process may manage its virtual memory address space more efficiently and may adjust the use of virtual memory space to the process' current workload.

Because chunked heaps include multiple chunks, chunked heaps do not allow for efficient offset-based indexing into side data structures. For example, according to one approach for using side data structures with a chunked heap, a header is included in each chunk. Any information related to a chunk (e.g. the size of the chunk, the location of side data structures associated with the chunk, etc.) is stored in a chunk table that is pointed to by a pointer stored into the chunk header. The chunk table is an associated array that indexes the side data structures for all chunks in the chunked heap based on the base address of each chunk. Look-ups into the chunk table for a particular chunk involve using the pointer stored in the header of that particular chunk to locate the associated array. A look-up is performed by using the base address of a chunk as an index into the associated array, where the look-up returns a pointer to a virtual memory address at which a side data structure associated with that chunk begins.

The disadvantage of the above approach for utilizing side data structures with chunked heaps is that the approach uses at least one level of indirection in order to get from a chunk to a side data structure associated with that chunk. Using indirection to access a side data structure is relatively slow because it involves at least one, and possibly more, memory accessing operations. For example, in order to access a side data structure for a particular chunk, a process needs to perform multiple memory accessing operations to determine a pointer to the side data structure (e.g. at least one memory accessing operation to locate the chunk table, and at least one memory accessing operation to perform a look-up into the chunk table). Such memory accessing operations are expensive and tend to hinder the process' performance if they are performed often.

Each chunk in a chunked heap may be specialized for storing a particular type of information such as, for example, a particular type of objects. Thus, prior to performing operations on a specialized chunk, a process may need to determine the type of the chunk in order to locate the executable instructions for the operations that need to be performed on that chunk. Determining the type of a chunk, however, may involve one or more expensive memory accessing operations. For example, according to one approach the type of a chunk may be stored in the chunk header or in a chunk table pointed to by a pointer stored in the chunk header—either way, a process needs to perform at least one memory accessing operation to determine the type of the chunk. In addition, after determining the type of the chunk, the process may need to perform at least one branching operation in order to get to the executable instructions for the specific operations that need to be performed on chunks of that particular type. However, branching operations are also very expensive and tend to hinder the process' performance if they are performed often.

Based on the forgoing, there is a clear need for techniques that efficiently utilize chunked heaps and overcome the disadvantages of the approach for utilizing chunked heaps that is described above.

SUMMARY

According to one embodiment, techniques are provided for offset-based addressing in the chunks of a chunked heap. The techniques provide for storing a side data structure within a portion of a chunk, where the side data structure begins at a predetermined offset within the range of virtual memory addresses allocated to the chunk. The side data structure comprises a plurality of entries, where each entry is associated with a corresponding section of the chunk. The techniques provide for locating a particular entry in the side data structure corresponding to a particular section of the chunk by using the predetermined offset and an index derived based on the particular section. With this approach, locating the particular entry does not include performing any memory accessing operations to obtain an indirect reference to the side data structure.

According to one embodiment, techniques are provided for storing one or more chunk-specific sets of executable instructions at one or more predetermined offsets within a chunk of a chunked heap. The techniques provide for storing a chunk-specific set of executable instructions within a portion of a chunk, where the set of executable instructions begins at a predetermined offset within the range of virtual memory addresses allocated to the chunk. The set of executable instructions, when executed, is operable to perform one or more operations that are specific to the chunk. The techniques provide for accessing the chunk-specific set of executable instructions within the chunk based at least in part on the predetermined offset, and for executing or causing the execution of the chunk-specific set of executable instructions in order to perform the one or more chunk-specific operations.

In some embodiments, the techniques described herein may be implemented in a JVM process. For example, in one embodiment a JVM process (or a component thereof) may store a side data structure at a predetermined offset within a chunk of a chunked heap. In another example, in one embodiment the JVM process (or a component thereof) may store a chunk-specific write barrier code at a predetermined offset within a chunk of a chunked heap. When a bytecode interpreter of the JVM process interprets the bytecodes of an operation that stores an object pointer into a Java object, the interpreter would execute the write barrier code stored within the chunk. When a dynamic adaptive compiler of the JVM process generates the executable code of an operation that stores an object pointer into a Java object, the dynamic adaptive compiler may insert a call to the write barrier code stored within the chunk.

DETAILED DESCRIPTION OF EMBODIMENT(S)

I. Overview of an Example System

Described herein are techniques for efficiently utilizing side data structures that are associated with a chunk of a chunked heap. Also described are techniques for storing chunk-specific executable instructions within a chunk of a chunked heap, and for efficiently accessing the chunk-specific executable instructions within the chunk. The techniques described herein may be implemented in any process that is operable to manage its virtual memory address space. Examples of such processes include, but are not limited to, servers, services, daemons, JVMs, and any OS kernel processes (e.g. processes executing in the kernel of the OS) and user processes (e.g. processes executing in a user address space).

Figure 1:
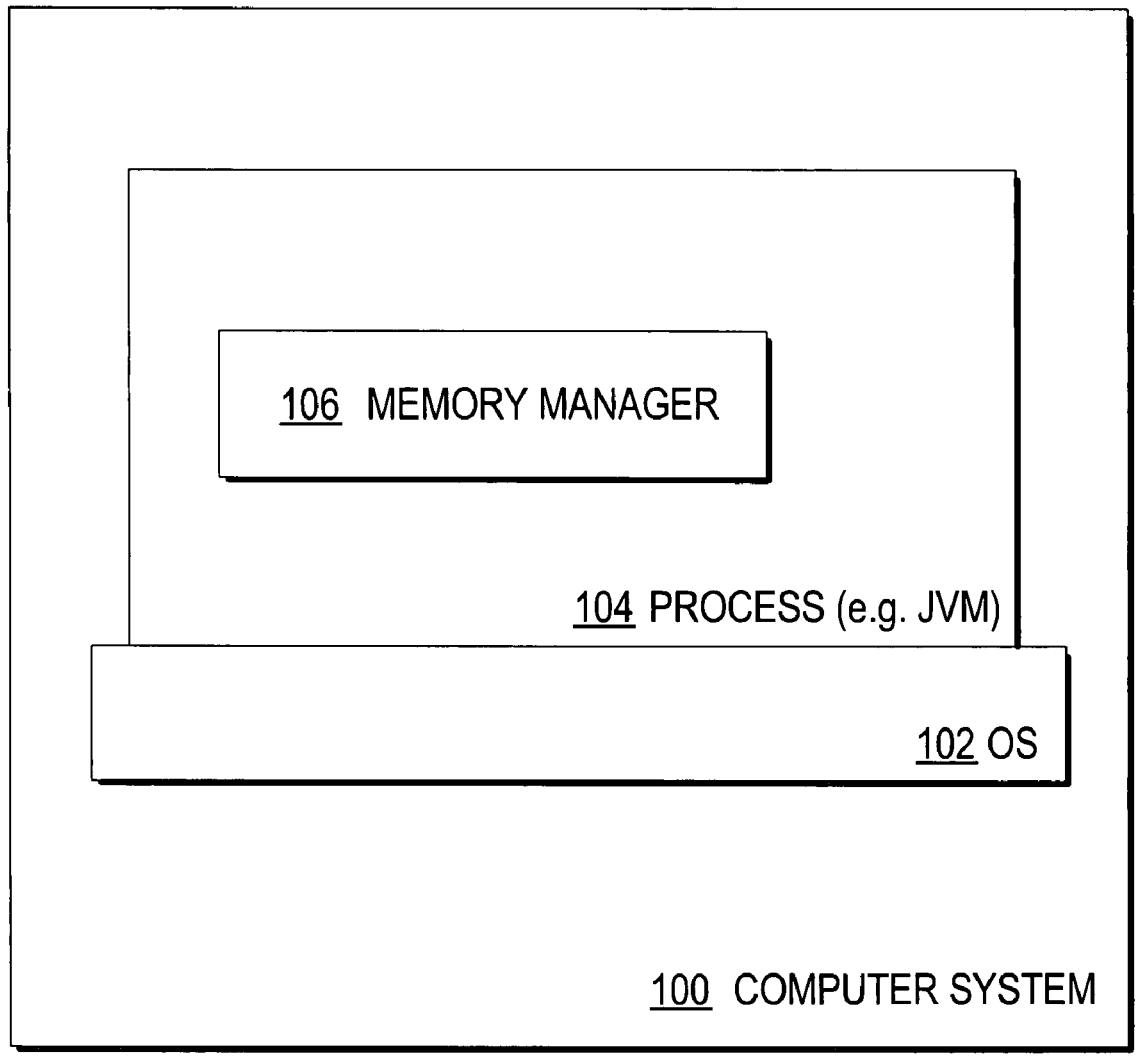
FIG. 1 is a block diagram of an example system in which an embodiment may be implemented.

FIG. 1 is a block diagram of an example system in which an embodiment of the present invention may be implemented. For the purpose of illustration, FIG. 1 depicts computer system 100 which includes a single process, for example a JVM. However, it is noted that the techniques described herein are not limited to being implemented on computer systems that run a single process or within processes that are JVMs. For purposes of the techniques described herein, the functional components of FIG. 1 may be implemented on any type of computer system, including but not limited to, desktop computers, servers, portable computers (e.g. notebook or laptop computers, personal digital assistants (PDAs), etc.), and other computing devices (e.g. mobile phones).

As illustrated in FIG. 1, computer system 100 comprises OS 102 and process 104. OS 102 provides all of the underlying, low-level functionalities that are relied upon by all of the other components in the computer system. These functionalities include, but are not limited to, assigning virtual memory space to processes, managing locks, managing processes, managing threads, etc. For purposes of the techniques described herein, OS 102 may be any operating system, including but not limited to Solaris, Unix, Linux, Windows, DOS, Mac OS, etc.

OS 102 provides computing resources to one or more processes, such as process 104, that are executing under the control of the OS. For example, when OS 102 initializes a process for execution, the OS assigns to the process a virtual memory address space. Different operating systems allow different amounts of virtual memory address space to a process. In a computer system that uses 32-bit addressing, a process can have a virtual memory address space that is addressable by 32-bit virtual addresses (which amounts to 4 GB of virtual memory address space).

Process 104 executes under the control of OS 102 and may provide various functionalities. Process 104 comprises a combination of software components and an allocation of computing resources provided by OS 102. The software components of process 104 may include, for example, the executable code of the process, any data needed by the process for execution, and any libraries that the process may be operable to utilize. The allocation of computing resources provided to process 104 by OS 102 may include physical memory and Central Processing Unit (CPU) time during which a processor (e.g. a CPU) executes the executable code of the process.

When process 104 is initialized by OS 102 and starts up, the process may store its static executable code and process data in the virtual memory address space provided by the OS. According to the techniques described herein, process 104 uses a chunked heap. Thus, at start up process 104 may also allocate ranges of virtual memory addresses that are to be used for a pre-configured number of heap chunks. Thereafter, during execution, process 104 may also dynamically allocate heap chunks in its virtual memory address space, and may also de-allocate any heap chunks that are no longer in use.

Process 104 comprises memory manager 106 that is operable to manage the virtual memory address space of the process. Memory manager 106 may comprise a combination of software components (e.g. executable code) and an allocation of computing resources (e.g. physical memory and CPU time). In the example embodiment illustrated in FIG. 1, memory manager 106 may execute as one or more threads within the address space of process 104. In other embodiments, memory manager 106 may include one or more threads configured to execute within the address space of OS 102. Memory manager 106 is operable to allocate in virtual memory the chunks of the chunked heap used by process 104 when such chunks are needed by the process. In addition, memory manager 106 may be operable to dynamically allocate virtual memory that is used for variables, stacks, and any other non-heap data. Further, memory manager 106 may comprise one or more components that are operable to manage the virtual memory allocated within the chunks of the chunked heap. For example, when the chunks used by process 104 are configured to store objects, memory manager 106 may comprise one or more garbage collectors that are operable to determine any unused objects and to reclaim the virtual memory allocated to such unused objects within the chunks of the chunked heap.

In an example embodiment, the techniques described herein provide for storing one or more side data structures at one or more predetermined offsets within a chunk. In this example embodiment, the techniques described herein enable efficient offset-based access to entries in the one or more side data structures without performing any memory accessing operations to obtain indirect references to the side data structures. Each side data structure comprises a plurality of entries, where each entry is associated with a corresponding section of the chunk. For example, in a chunked object heap, a section of the chunk to which an entry in a side data structure corresponds may include, without limitation, an object, a portion of an object (e.g. an object header), a section of the chunk which is equal to the minimal size of an object, or a card of a plurality of equal-sized cards. As used herein, "card" refers to a logical section of a chunk; a chunk may be logically divided into multiple cards. As used herein, "memory accessing operation" refers to an operation including at least one processor instruction which fetches (or otherwise uses) an operand value from dynamic memory or which stores an operand value in dynamic memory.

In an example embodiment, the techniques described herein provide for storing one or more chunk-specific sets of executable instructions at one or more predetermined offsets within a chunk. In this example embodiment, the techniques described herein provide for efficiently accessing the chunk-specific sets of executable instructions within the chunk based at least in part on the predetermined offsets, and for executing or causing the execution of the chunk-specific sets of executable instructions. In some embodiments, the techniques described herein may provide for storing both side data structures and chunk-specific sets of executable instructions within the same chunk.

In an example embodiment, the techniques described herein may be implemented in a JVM process. For example, process 104 in FIG. 1 may be a JVM process executing under the control of OS 102, where computer system 100 in which OS 102 operates may be a server computer system, a client computer system, a portable computer system, a cellular telephone, a PDA, or any other computing device. The JVM process provides a platform for supporting execution of Java client and/or server applications. The Java applications may execute as threads within the JVM process, which threads may instantiate and store one or more Java objects in a chunked heap used by the JVM process. The JVM process may utilize side data structures and chunk-specific sets of executable instructions in accordance with the techniques described herein.

II. Side Data Structures within Chunks of a Chunked Heap

Figure 2A:
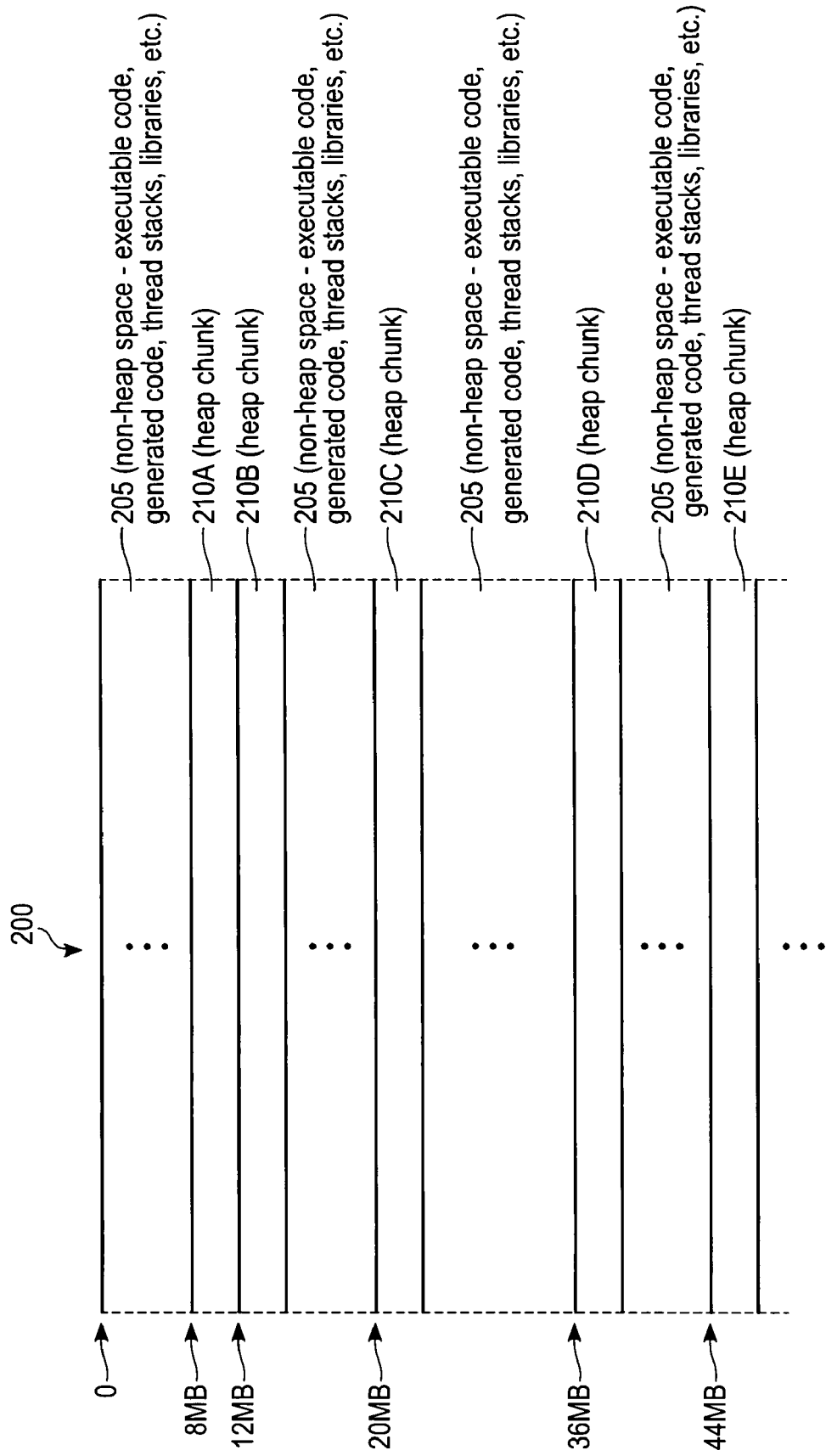
FIG. 2A is a block diagram illustrating an example of a chunked heap according to one embodiment.

FIG. 2A is a block diagram illustrating a chunked heap according to an example embodiment.

In FIG. 2A, the chunks of a chunked heap are allocated in virtual memory address space 200. The chunked heap comprises chunks 210A, 210B, 210C, 210D, and 210E, which chunks are allocated in ranges of virtual memory addresses that are non-contiguous. For example, chunk 210A is allocated in virtual memory address space 200 between virtual addresses 8 MB and 12 MB; chunk 210B is allocated in virtual memory address space 200 between virtual addresses 12 MB and 16 MB; chunk 210C is allocated in virtual memory address space 200 between virtual addresses 20 MB and 24 MB; chunk 210D is allocated in virtual memory address space 200 between virtual addresses 36 MB and 40 MB; and chunk 210E is allocated in virtual memory address space 200 between virtual addresses 44 MB and 48 MB. Chunks 210A-210E are not allocated in virtual memory address space 200 all at the same time—thus, they don't need to be allocated in a single contiguous range of virtual memory addresses. The process associated with virtual memory address space 200 may allocate chunks 210A-210E (and any additional chunks) by making calls to a memory allocating function that may be provided by a memory manager, such as, for example, malloc( ) and mmap( ). In the example embodiment of FIG. 2A, the chunks in the chunked heap are all of equal size (4 MB). It is noted that in different embodiments, the size of the chunks in a chunked heap may vary depending on the particular heap implementation.

The portions of virtual memory address space 200 between chunks 210A-210E may be allocated to any non-heap data. Examples of non-heap data include, but are not limited to, executable code, static and/or dynamic libraries, thread stacks, and any other code or data that may be allocated in the virtual memory address space of a process. In embodiments in which a chunked heap is used by a JVM process, the non-heap data may also include executable code generated by a dynamic adaptive compiler (e.g. a Just-In-Time (JIT) compiler).

In the example embodiment of FIG. 2A, chunks 210A-210E are each allocated at a boundary identified by a virtual address in which a certain number of lower bits are zero. An example of such boundary is any boundary identified by a virtual address that is a multiple of a value which itself is a power of 2. For example, in an OS that uses 4 KB physical memory pages, the chunks of a chunked heap can be aligned at the multiples of 4 KB address boundaries—so that each heap chunk would start at some multiple of a 4 KB virtual address.

Figure 2B:
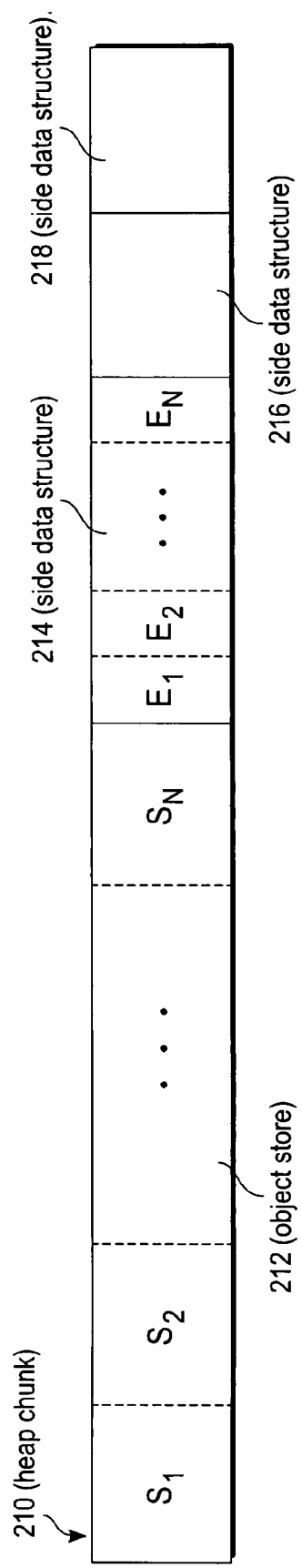
FIG. 2B is a block diagram illustrating an example structure of a chunk according to one embodiment.

FIG. 2B is a block diagram illustrating the structure of a chunk according to an example embodiment. In this example embodiment, chunk 210 is configured to store objects. For example, chunk 210 may be included in a chunked object heap that is utilized by a JVM process, where the JVM process is operable to instantiate objects and to store the objects in the chunks of the chunked heap. The objects may be instantiated from object-oriented classes or may be any objects utilized by the JVM process.

According to the techniques described herein, chunk 210 comprises object store 212 and side data structures 214, 216, and 218. Object store 212 is a range of virtual memory addresses within chunk 210 that is used for storing objects. Each of side data structures 214, 216, and 218 begins at a predetermined offset within the range of virtual memory addresses allocated to chunk 210. It is noted that the techniques described herein are not limited to any particular number of side data structures that can be stored in a chunk; thus, the example chunk structure illustrated in FIG. 2B is to be regarded in an illustrative rather than a restrictive sense.

According to the techniques described herein, each side data structure stored in a chunk comprises a plurality of entries, where each entry is associated with a corresponding section in the storage portion of the chunk. (The storage portion of the chunk is the portion that does not store the side data structures.) For example, in FIG. 2B object store 212 of chunk 210 is logically divided into sections $S_1$-$S_N$. Side data structure 214 includes entries $E_1$-$E_N$, where each entry $E_i$ corresponds to section $S_i$ in object store 212. The predetermined offset at which a side data structure begins within a chunk and the size of the side data structure can be determined based on the size of an entry in the side data structure and the size of the sections to which entries of the side data structure correspond.

For example, for any chunk of a given size, the number of sections in the storage portion of the chunk can be determined by dividing the size of the chunk by the size of each chunk section. Multiplying the number of sections in the chunk by the size of an entry in a side data structure would yield the size of that side data structure. Thus, any side data structure associated with a chunk of a given size would be of a fixed, known size relative to the size of that chunk. The size of a data structure can be used to determine the offset at which the side data structure may be stored in the chunk depending on where the side data structure is to be stored within the chunk. For instance, if a side data structure is to be stored in the high portion of a chunk, the offset at which the side data structure begins in the chunk may be determined by subtracting the size of the side data structure from the largest virtual memory address allocated to the chunk plus one. If a chunk stores more than one side data structure, the offset at which each side data structure begins within the chunk may be determined in a similar way, except that the size of any already allocated side data structure would also need to be accounted for when the offsets are determined.

According to the techniques described herein, a process that is aware of the predetermined offset at which a side data structure begins within a chunk may be operable to locate the side data structure and any entries stored therein without performing any memory accessing operations. For example, suppose that the chunks of a chunked heap used by a process are of equal size, and that each chunk stores a side data structure of the same size. Thus, the side data structure would begin at the same predetermined offset within each chunk. This predetermined offset may be stored in a processor register or may appear as a constant operand in the instruction stream of the process that needs it to access the side data structure. When the process needs to access the side data structure of a particular chunk, the process would be able to determine the virtual address of the side data structure by adding the predetermined offset stored in the processor register to the base address of the particular chunk without the need to perform any memory accessing operations. This is in contrast to approaches that use chunk tables to index the side data structures of all chunks in a chunked heap, where accessing the chunk table to determine the virtual address of a side data structure would require at least one memory accessing operation.

In this manner, the techniques described herein obviate the need to use indirection when locating a side data structure associated with a chunk. By storing side data structures at predetermined offsets within a chunk, the techniques described herein avoid the use of memory accessing operations. Instead, the techniques described herein may use one or more operations which involve only processor instructions that have register operands. An example of such operation is an arithmetic operation for performing address computations by using only processor instructions having register operands. Since modern processors are operable to execute processor instructions having register operands extremely fast and since in modern computer architectures dynamic memory tends to be located ever further away from the processors, execution of instructions having register operands is virtually free while instructions that fetch, use, or store memory operands are very costly for the processors to execute. In addition, using arithmetic operations to perform address computations leads to faster execution because arithmetic operations overall tend to include fewer processor instructions than other types of operations.

Figure 3:
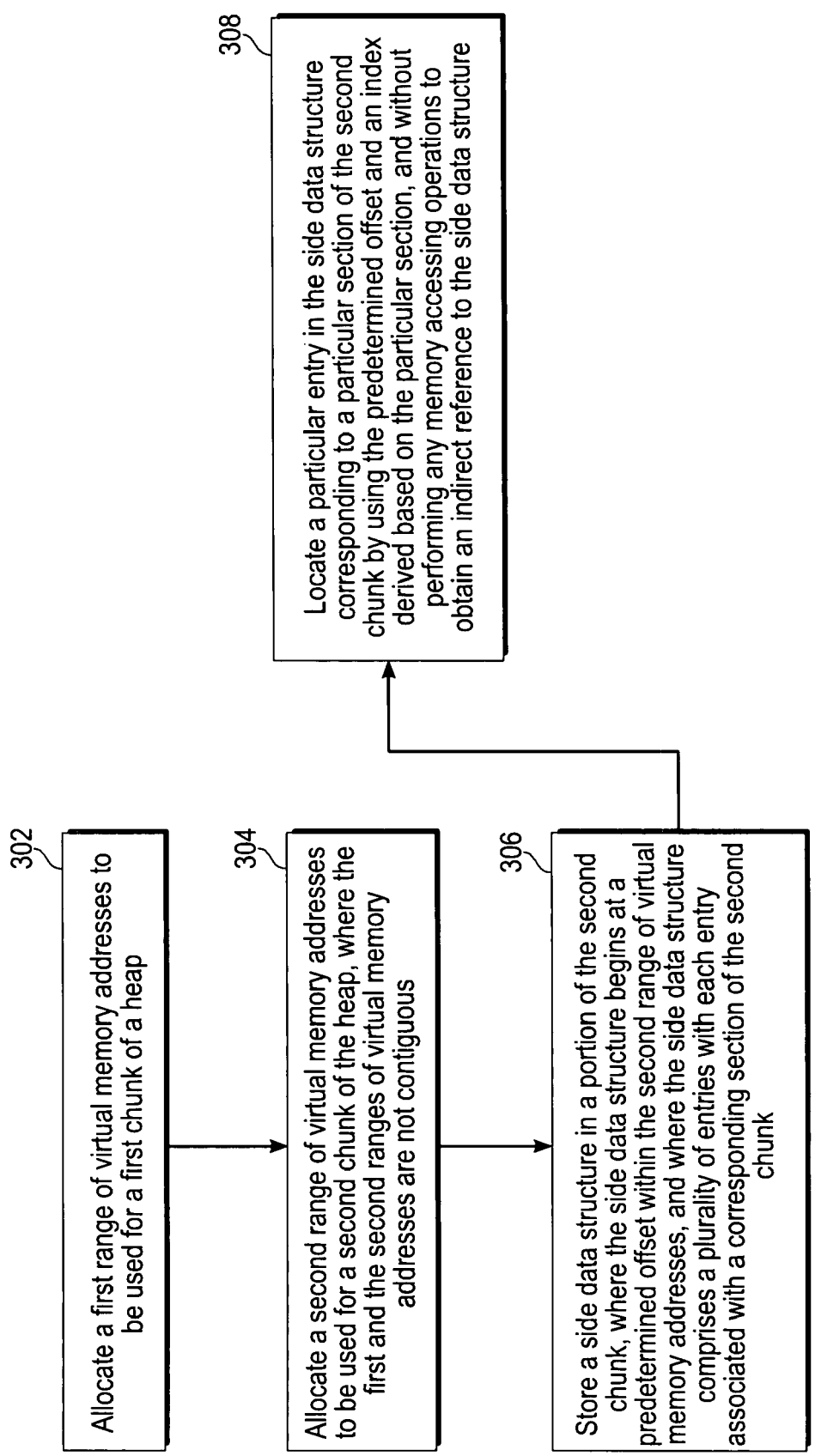
FIG. 3 is a flow diagram illustrating an example method for using a chunked heap according to one embodiment.

FIG. 3 is a flow diagram illustrating a method for using a chunked heap according to an example embodiment.

In step 302, a process (or a component thereof) allocates a first range of virtual memory addresses that is to be used for a first chunk of a chunked heap. In step 304, the process (or a component thereof) allocates a second range of virtual memory addresses that is to be used for a second chunk of the chunked heap. The first range of virtual memory addresses (allocated to the first chunk) and the second range of virtual addresses (allocated to the second chunk) are not allocated in a contiguous range of virtual memory addresses.

In step 306, the process (or a component thereof) stores a side data structure in a portion of the second chunk. The side data structure begins at a predetermined offset within the second range of virtual memory addresses. The side data structure comprises a plurality of entries, where each entry is associated with a corresponding section of the second chunk.

For example, the side data structure may be a marking bitmap that is used by the process (or by a component thereof, such as a garbage collector) to perform efficient garbage collection over objects that are stored in the second chunk. Each entry in the marking bitmap may be a bit that corresponds to a range of virtual addresses in the second chunk that is equal to the minimum size of an object that can be stored in the chunk.

In another example, the side data structure may be a cardmark array that is used by the process (or by a component thereof, such as a garbage collector) to perform efficient garbage collection over objects that are stored in the second chunk. Each entry in the cardmark array may be one byte that corresponds to a range of virtual addresses in the second chunk where the range represents one card of a plurality of equal-sized cards into which the second chunk may be logically divided.

In step 308, the process (or a component thereof) locates a particular entry in the side data structure by using the predetermined offset (at which the side data structure begins in the second chunk) and an index derived based on the particular section in the second chunk to which the particular entry corresponds. According to the techniques described herein, in locating the particular entry the process (or the component thereof) does not perform any memory accessing operations to obtain an indirect reference to the side data structure.

For example, suppose that the side data structure stored in the second chunk is a marking bitmap, and the process needs to determine an entry into the marking bitmap that corresponds to a particular object stored in the second chunk. Based on the virtual address of the particular object, the process can determine the base address of the second chunk by zeroing out the low order bits of the virtual address of the object. Next, the value indicated by the low order bits of the virtual address of the particular object can be used to determine an index into the marking bitmap by using scaling, where the index identifies the entry in the marking bitmap that corresponds to the particular object. For example, the scaling may involve dividing the value indicated by the low order bits of the virtual address of the particular object by the minimum size which an object can occupy in the second chunk. Thereafter, the virtual memory address of the corresponding entry in the marking bitmap can be determined by adding the base address of the second chunk, the predetermined offset (at which the marking bitmap begins in the second chunk), and the index that was computed by scaling the value indicated by the low order bits of the virtual address of the particular object. According to the techniques described herein, the process determines the virtual memory address of the corresponding entry in the marking bitmap without performing any memory accessing operations.

The method in FIG. 3 is described with respect to the second chunk for illustrative purposes only. It is noted that steps 306 and 308 may be performed with respect to any chunk in a chunked heap and to any side data structure stored therein including, without limitation, the first chunk and any chunk allocated at any time in the virtual memory address space of the process.

In one example embodiment, the techniques described herein may be performed by a JVM process that uses a chunked object heap. In this embodiment, the JVM process may execute under the control of an OS that provides physical memory pages of a certain size. According to the techniques described herein, in this embodiment the JVM process may be configured to allocate chunks that are of the same size as the physical memory pages. For example, the physical memory pages provided by the OS may be 4 MB, and the chunks allocated by the JVM process may also be 4 MB. Since according to the techniques described herein side data structures associated with a chunk are stored within that chunk, the JVM process would never cause an OS page fault when the JVM process attempts to access a side data structure after accessing an object in the chunk. This is in contrast to approaches that use chunk tables to index the side data structures of all chunks in a chunked heap because such approaches may cause OS page faults when a chunk and its associated side data structure are located on separate physical memory pages. Since an OS page fault is a very expensive operation, in this example embodiment the techniques described herein provide for improved process performance.

III. Garbage Collection and Write Barrier Code

The techniques described herein may be performed by a JVM process that uses a chunked object heap. The JVM process may include a memory manager that comprises one or more garbage collectors. As used herein, "garbage collector" refers to a set of code which, when executed, is operable to perform garbage collection. For example, a garbage collector may be implemented as a thread that may comprise a combination of software components (e.g. a set of executable code) and an allocation of computing resources (e.g. physical memory and CPU time). As used herein, "garbage collection" refers to a mechanism for determining any unused objects in a heap and for reclaiming the virtual memory allocated to unused objects.

Most objects that are instantiated and stored by a JVM process tend to become unreferenced or no longer needed rather quickly. For example, while a Java application is executing it tends to instantiate and store on the heap of a JVM process a lot of temporary objects, which are used for a short period of time and thereafter are not accessed any more. Thus, only a few objects stored on the heap of a JVM process tend to live (e.g. to being referenced and/or used) for a long time. Objects that have just been instantiated and stored on the heap are referred to herein as "young generation" objects; young generation objects that live for longer periods of time are usually promoted to (and referred to herein as) "old generation" objects. For the purposes of garbage collection, it is easier and more efficient to separate young generation objects and old generation objects in separate portions of an object heap. Since young and old generation objects have different garbage density, a JVM process may apply different types of garbage collectors to perform garbage collection over the different portions of the heap that store the young and the old generation objects.

Accordingly, in a JVM process that uses a chunked object heap, it would be more efficient to store young generation objects and old generation objects in separate chunks. In this way, the JVM process can apply one type of a garbage collector on a chunk that stores young generation objects, and a different type of a garbage collector on a chunk that stores old generation objects.

For example, to collect over young generation objects, the JVM process may use a garbage collector that implements a scavenger collection algorithm. An example of such garbage collector is the semi-space garbage collector. A semi-space garbage collector may traverse the young generation objects stored in a chunk and may determine which objects are still alive; thereafter, the semi-space garbage collector would copy the live objects to a different chunk (and/or a different portion of the same chunk). In this way, the semi-space garbage collector operates efficiently on a chunk storing relatively few live young generation objects because the collector can reclaim a large amount of virtual memory while copying out relatively few alive objects. For chunks storing old generation objects the JVM may use a different garbage collector than the collector for young generation objects. For example, the JVM process may use a garbage collector that identifies dead objects and thereafter reclaims the virtual memory of the dead objects by compacting the objects that are still alive. In this way, the garbage collector for old generation objects can efficiently reclaim virtual memory in a chunk that stores a large number of alive old generation objects with relatively few dead objects in between.

It is a challenging task to efficiently implement generational garbage collectors in a JVM process that uses a chunked object heap. In order to determine whether a particular object is alive, a garbage collector needs to determine whether the particular object is reachable from a root object through object pointers stored in other intermediate objects. Since in a typical JVM process there would be a lot more old generation objects than young generation objects, determining whether a young generation object is referenced by any old generation object may require the garbage collector to traverse a large number of old generation objects. In a chunked object heap, this problem is exacerbated because the young and old generation objects would be typically stored in separate chunks.

In order to address this problem, an example embodiment uses write barrier code and side data structures to facilitate efficient garbage collection over young generation objects. As used herein, "write barrier code" refers to a set of executable code which, when executed, is operable to perform a particular operation or operations with respect to a particular side data structure or structures. In this example embodiment, a JVM process executes a write barrier code every time the JVM process (or a component thereof) stores an object pointer within an old generation object. When executed, the write barrier code determines an entry in a side data structure, where the entry corresponds to the virtual address within the old generation object at which the object pointer is being stored. In order to efficiently utilize the virtual memory address space allocated to a chunk of old generation objects, in this example embodiment an entry into the side data structure may correspond to a chunk section that may store multiple objects and/or parts of objects. Thus, the write barrier code may use scaling when determining the corresponding entry in the side data structure.

After determining the corresponding entry in the side data structure the write barrier code marks the entry, for example, by storing some particular value in the entry. Thereafter, when garbage collection is performed over the young generation objects, the garbage collector inspects the entries in the side data structure and traverses only those old generation objects that are associated with marked entries. In this way, the write barrier code eliminates the need for the garbage collector to traverse all old generation objects when determining whether young generation objects are alive.

In this example embodiment, the techniques described herein facilitate efficient execution of the write barrier code. Since according to the techniques described herein a side data structure is stored at a predetermined, known offset within a chunk, the write barrier code would not need to perform any memory accessing operations when locating an entry in the side data structure.

Figure 4:
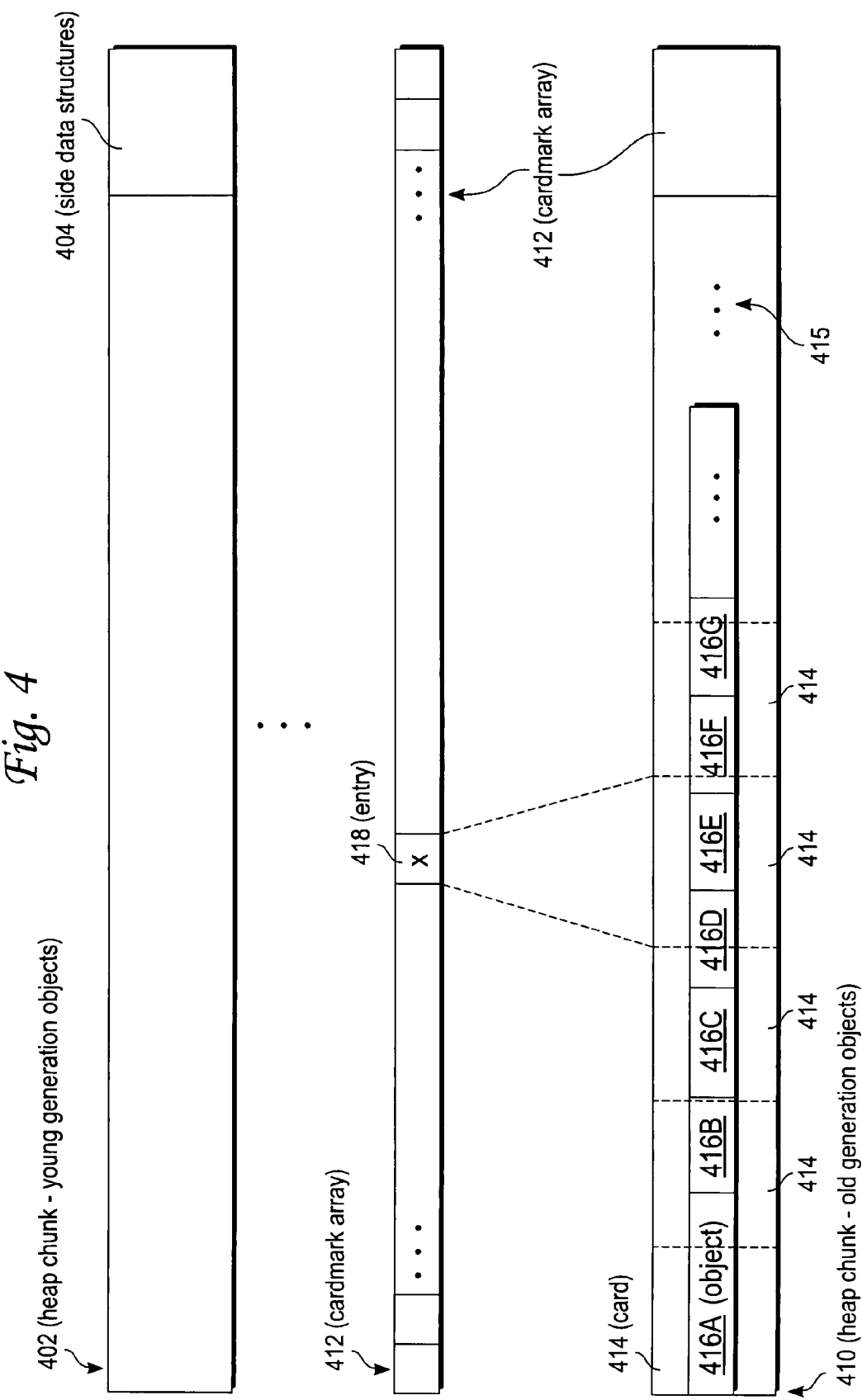
FIG. 4 is a block diagram illustrating the operation of a write barrier code according to one embodiment.

FIG. 4 is a block diagram illustrating the operation of a write barrier code according to this example embodiment. A JVM process (not shown in FIG. 4) uses a chunked object heap that includes chunks 402 and 410. Chunk 402 is configured for storing young generation objects. Stored within chunk 402 may be one or more side data structures, such as, for example, side data structure 404.

As illustrated in FIG. 4, chunk 410 is configured for storing old generation objects, such as, for example, objects 416A, 416B, 416C, 416D, 416E, 416F, 416G, etc. Chunk 410 is logically divided into a plurality of equal-sized cards, such as, for example, cards 414. Cardmark array 412 is stored at a predetermined, known offset within chunk 410. Cardmark array 412 comprises a plurality of entries where each entry is one byte that is associated with, and corresponds to, one of cards 414. Ellipsis 415 indicates that chunk 410 may include other cards 414 and other old generation objects. (For illustrations purposes only, in FIG. 4 cardmark array 412 is depicted above chunk 410. Further, in FIG. 4 chunk 410 is depicted as storing only one cardmark array. According to the techniques described herein, however, multiple side data structures such as cardmark arrays or marking bitmaps may be stored within a chunk.)

In the example embodiment of FIG. 4, when the JVM process allocates chunk 410, the JVM process creates cardmark array 412 within the chunk and initializes each byte of the cardmark array to the value "1". Thereafter, the JVM process (or any component thereof) is operable to execute a write barrier code to mark an entry in cardmark array 412 every time an object pointer is stored in any object in chunk 410. For example, the JVM process may use a dynamic adaptive compiler to inline the write barrier code after each operation that stores an object pointer. In another example, the JVM process may use an interpreter of bytecodes to include an execution of the write barrier code at each operation that stores an object pointer. (In the example embodiment illustrated in FIG. 4, it is irrelevant whether the object pointer being stored references an old generation object or a young generation object; in other embodiments, it may be relevant with respect to the write barrier code whether the object pointer being stored references an old generation object or a young generation object.)

For example, suppose that the JVM process executes an operation to store an object pointer in object 416E. After storing the object pointer in object 416E, the JVM process executes the write barrier code to mark the corresponding entry 418 in cardmark array 412.

According to the techniques described herein, the write barrier code first determines the base address of chunk 410 based on the particular virtual address of the location (in object 416E) where the object pointer is being stored. Since in this embodiment all chunks are allocated at a boundary that is a multiple of a power-of-2 value, the write barrier code may execute an arithmetic operation to zero out the lower order bits of the particular virtual address. Then, the write barrier code scales the value of the lower order bits of the particular virtual address to determine an index into cardmark array 412, which index determines where entry 418 is located. In the particular example of FIG. 4, the write barrier code may compute the index by performing one or more arithmetic operations to divide the value of the lower order bits of the particular virtual address by the size of card 414 (which size is predetermined or otherwise known). Thereafter, to determine the virtual address of entry 418, the write barrier code adds the base address of chunk 410, the predetermined offset in chunk 410 at which cardmark array 412 begins, and the computed index into cardmark array 412. According to the techniques described herein, in determining the virtual address of entry 418 the write barrier code does not perform any memory accessing operations but instead performs only arithmetic operations having register operands and/or constant operands from the instruction stream of the write barrier code. After determining the virtual address of entry 418, the write barrier code marks the entry by, for example, executing a processor instruction to set to "0" the value of the byte located at the virtual address of entry 418.

When a garbage collector is executed to perform garbage collection over the objects in chunk 402 (which stores young generation objects), the garbage collector inspects cardmark array 412. For each entry in cardmark array 412 that is marked, the garbage collector determines the corresponding card 414 in chunk 410, and traverses only the objects stored therein to find out whether any object pointers stored in these objects reference a young generation object in chunk 402. For example, the garbage collector would find that entry 418 is marked as a "0", would traverse the objects in the corresponding card 414, and would find the object pointer stored in object 416E. Since the expectation is that there would be few marked entries in cardmark array 412, the garbage collector would need to inspect for any object pointers the objects in a relatively few cards in chunk 410 instead of inspecting all old generation objects in the chunk.

While in the example of FIG. 4 a write barrier code is described with respect to a cardmark array, the techniques described herein are not in any way limited to being implemented by a write barrier code or for side data structures that are cardmark arrays. In various embodiments, any set of code may use the techniques described herein to efficiently access side data structures that are different than cardmark arrays, such as, for example, marking bitmaps and block offset tables. A block offset table for a chunk is a side data structure that includes offset information indicating how far back a garbage collector needs to go to find the beginning of an object when the object spans a card boundary in a cardmark array. For example, with respect to FIG. 4, chunk 410 may include a block offset table which would include an entry indicating an offset, from a card boundary, indicating where object 416D starts; similar entries may also be included for objects 416C and 416F.

In other embodiments, a read barrier code may use the techniques described herein to efficiently locate entries in side data structures. As used herein, "read barrier code" refers to a set of executable code that is executed for operations that read object references. For example, a semi-space garbage collector may be operable to not update or otherwise correct pointers in objects that the collector is copying out. In this example, the semi-space collector may use a read barrier code to figure out, on every object read operation, where a particular object is moved and to fix any affected object pointers accordingly.

IV. Chunk-Specific Executable Instructions within Chunks of a Chunked Heap

The techniques described herein provide for storing a chunk-specific set of executable instructions at a predetermined offset within a chunk of a chunked heap. A chunk-specific set of executable instructions may be efficiently accessed within a chunk based at least in part on the predetermined offset. When executed, the chunk-specific set of executable instructions stored in a particular chunk may be operable to perform one or more operations that are specific to that particular chunk. In some embodiments, the techniques described herein may provide for storing, within the same chunk, both one or more side data structures and one or more chunk-specific sets of executable instructions.

Figure 5:
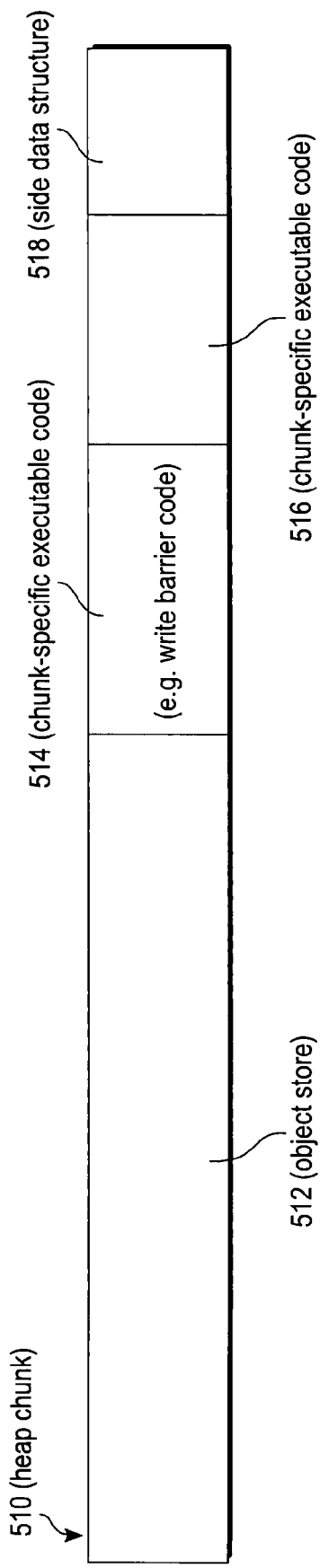
FIG. 5 is a block diagram illustrating an example of a chunk that stores, at predetermined offsets, chunk-specific set of executable instructions and a side data structure according to one embodiment.

FIG. 5 is a block diagram illustrating the structure of a chunk that stores, at predetermined offsets, two chunk-specific sets of executable instructions and a side data structure according to an example embodiment. In this example embodiment, chunk 510 is configured to store objects. For example, chunk 510 may be included in a chunked object heap that is utilized by a JVM process, where the JVM process is operable to instantiate objects from object-oriented classes and to store the objects in the chunks of the chunked heap.

According to the techniques described herein, chunk 510 comprises object store 512, chunk-specific sets of executable instructions 514 and 516, and side data structure 518. Object store 512 is a range of virtual memory addresses within chunk 510 that is used for storing objects. Each of executable instruction sets 514 and 516 begins at a predetermined offset within the range of virtual memory addresses allocated to chunk 510. Side data structure 518 is a range of virtual memory addresses that also begins at a predetermined offset within the range of virtual memory addresses allocated to chunk 510. When executed, each of executable instruction sets 514 and 516 is operable to perform operations that are specific to chunk 510. For example, executable instruction set 514 may be a write barrier code which is executed each time an object pointer is stored in any object within object store 512 and which, when executed, is operable to locate and mark a corresponding entry in side data structure 518. Executable instruction set 516 may be a set of executable instructions which, when executed, is operable to determine and/or return some specific information about chunk 510 (for example, information indicating whether the chunk is configured to store young or old generation objects). It is noted that the sets of executable instructions 514 and 516 need not be of the same size as long as each of set of executable instructions starts at a well-known fixed offset within chink 510. For illustration purposes only, chunk 510 is depicted in FIG. 5 as storing two sets of executable instructions and one side data structure; however, it is noted that the techniques described herein are not limited to any particular number of sets of executable instructions and/or any particular number of side data structures that can be stored in a chunk at some fixed offsets. For this reason, the example chunk structure illustrated in FIG. 5 is to be regarded in an illustrative rather than a restrictive sense.

Figure 6:
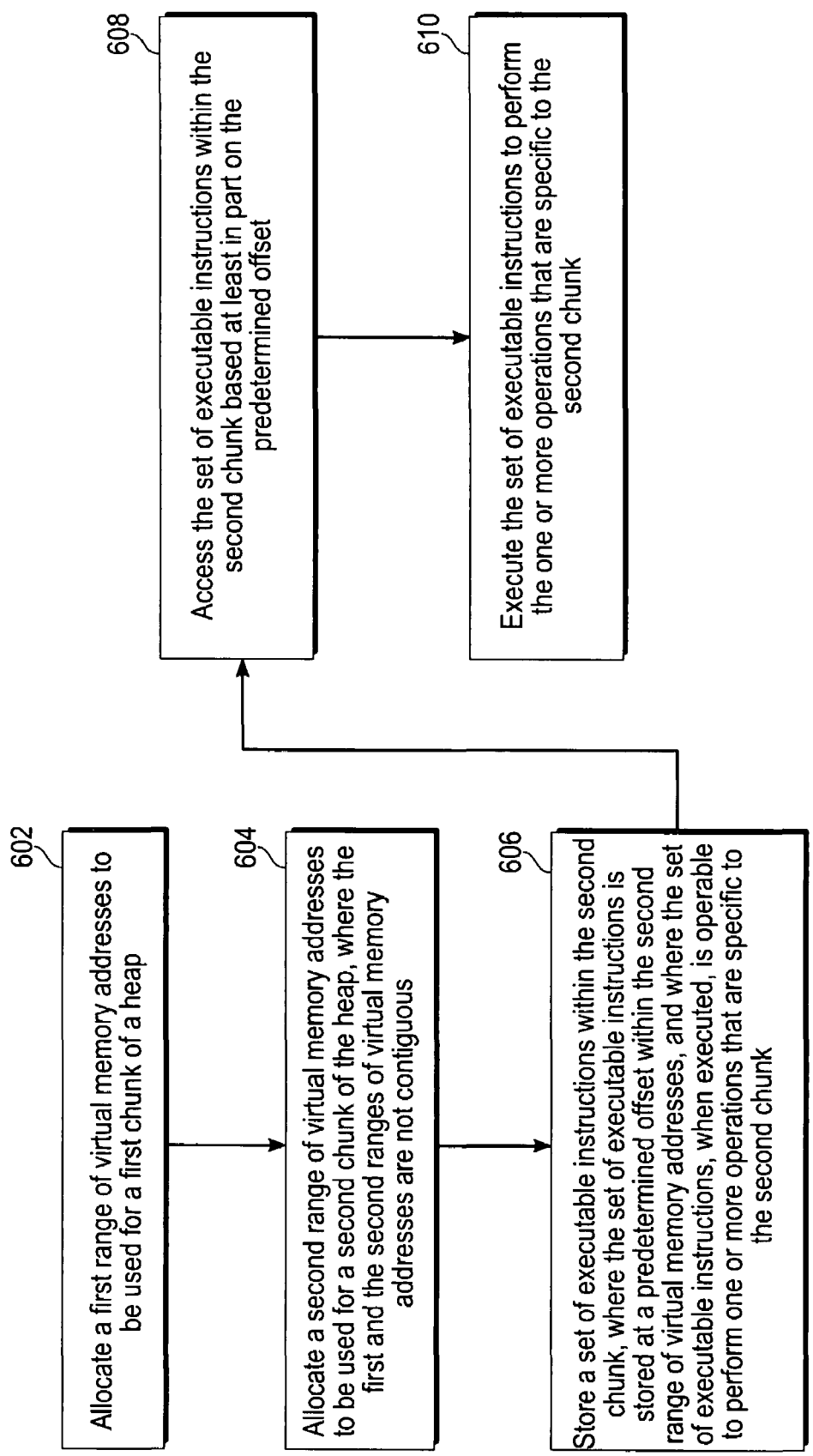
FIG. 6 is a flow diagram illustrating an example method for using a set of executable instructions that is stored at a predetermined offset within a chunk of a chunked heap according to one embodiment.

FIG. 6 is a flow diagram illustrating a method for using a set of executable instructions that is stored at a predetermined offset within a chunk of a chunked heap according to an example embodiment.

In step 602, a process (or a component thereof) allocates a first range of virtual memory addresses that is to be used for a first chunk of a chunked heap. In step 604, the process (or a component thereof) allocates a second range of virtual memory addresses that are to be used for a second chunk of the chunked heap. The first range of virtual memory addresses (allocated to the first chunk) and the second range of virtual addresses (allocated to the second chunk) are not allocated in a contiguous range of virtual memory addresses.

In step 606, the process (or a component thereof) stores a set of executable instructions within the second chunk. The set of executable instructions begins at a predetermined offset within the second range of virtual memory addresses. When executed, the set of executable instructions is operable to perform one or more operations that are specific to the second chunk.

In step 608, the process (or a component thereof) accesses the set of executable instructions within the second chunk based at least on the predetermined offset. The process (or a component thereof) may include a call to the set of executable instructions. The call comprises a processor instruction including as an operand the virtual memory address of the beginning of the set of executable instructions within the chunk. The virtual memory address of the set of executable instructions may be determined by adding the predetermined offset to the base address of the chunk.

After accessing the set of executable instructions within the chunk, in step 610 the process (or a component thereof) may execute the set of executable instructions to perform the one or more chunk-specific operations. When the set of executable instructions completes execution, execution control is returned to the entity that called the set of executable instructions (for example, the process or a component thereof).

The method in FIG. 6 is described with respect to the second chunk for illustrative purposes only. It is noted that steps 606 and 608 may be performed with respect to any chunk in a chunked heap and to any set of executable instructions stored therein including, without limitation, the first chunk and any chunk allocated at any time in the virtual memory address space of the process.

In one embodiment, the techniques described herein may be performed by a JVM process that uses a chunked object heap. In this embodiment, the JVM process may include a memory manager that comprises one or more garbage collectors operable to perform garbage collection in the chunks of the chunked object heap, where each chunk stores either young generation objects or old generation objects.

In a contiguous object heap, each of young and old generation objects may be stored in a different portion of the contiguous heap. If a JVM process using such contiguous object heap needs to resize the portions of the heap allocated to the young and the old generations of objects, the JVM process would need to set a divider pointer (e.g. the virtual memory address that divides the heap into portions) accordingly and then store objects on either side of the divider pointer depending on whether the objects are young or old generation objects. Thus, the JVM process can determine whether a particular object is in the young or the old generation by comparing the virtual address of the particular object to the divider pointer. Similarly, the JVM process can determine whether an object pointer stored within an old generation object references a young or an old generation object by comparing the object pointer to the divider pointer.

In a chunked object heap, each chunk of the heap may be configured or dedicated for storing either young or old generation objects. For example, in some embodiments one chunk may be configured for storing young generation objects and all other chunks in the chunked heap may be configured for storing old generation objects. In these embodiments, a JVM process using the chunked heap can determine whether a particular object is in the young or the old generation by determining whether or not the virtual address of the particular object is an address within the range of virtual memory addresses allocated to the young generation chunk. In a typical chunked object heap, each chunk may include a chunk header that stores a bit indicating the type of the chunk (e.g. whether or not the chunk is configured for storing young generation objects). A JVM process using a traditional chunked object heap can determine whether a particular object is in the young or the old generation by looking up the address of the base of the chunk in a table stored in memory. Thus, to determine the type of a chunk in a traditional chunked object heap, the JVM process may need to perform one or more memory accessing operations which, when performed often, may hinder the execution performance of the process.

According to the techniques described herein, in one embodiment a JVM process may comprise a dynamic adaptive compiler that is operable to generate executable code during the runtime of the JVM process. In this embodiment, when the JVM process or a component thereof allocates a chunk in the virtual memory address space of the process, the dynamic adaptive compiler generates a set of executable instructions that are specific to that chunk. According to the techniques described herein, the JVM process (or a component thereof) may store such dynamically generated sets of executable instructions at the same predetermined offset within each chunk that is allocated by the JVM process. A particular set of executable instructions stored in a particular chunk is such that when executed, the particular set of executable instructions is operable to return a value indicating whether the particular chunk is configured for storing young or old generation objects. For example, when the JVM process (or a component thereof such as a garbage collector) needs to determine whether an object pointer stored within an old generation object references a young or an old generation object, the JVM process or the component thereof may: determine the base address of the chunk referenced by the object pointer (e.g. by zeroing out the lower order bits of the object pointer); add this base address to the predetermined offset at which a set of executable instructions is stored within that chunk; and make a call to the set of executable instructions, which when executed would return a value indicating the type of that chunk. Thus, according to the techniques described herein, the JVM process or the component thereof may determine the type of a chunk that stores an object referenced by an object pointer without performing any memory accessing operations, which would improve the overall execution performance of the JVM process.

The techniques described herein for storing chunk-specific executable instructions at a predetermined offset within a chunk of a chunked heap are not limited to any particular type of chunk-specific executable instructions. Rather, the techniques described herein may be used for any type of executable instructions that can be specialized, on a per-chunk basis, with respect to the chunks of a chunked heap. For this reason, the examples of chunk-specific executable instructions provided in the present disclosure are to be regarded in an illustrative rather than a restrictive sense.

V. Write Barrier Code Implemented as Chunk-Specific Executable Instructions

In one operational context, a JVM process using a chunked object heap may comprise one or more garbage collectors operable to perform garbage collection in the chunks of the heap, where each chunk stores either young generation objects or old generation objects. In this operational context, when the JVM process or component thereof performs an operation to store an object pointer into a particular object, the JVM process may need to use a different write barrier code depending on whether the particular object is a young generation object or an old generation object.

For example, if the particular object (into which an object pointer is being stored) is a young generation object, then no write barrier code would need to be executed; if the particular object is an old generation object, then the JVM process would need to execute a write barrier code in order to determine and mark an entry into an associated side data structure (which subsequently may be used by a garbage collector that performs garbage collection of young generation objects). Since in this operational context the write barrier code (or lack thereof) for chunks storing young generation objects is different than the write barrier code for chunks storing old generation objects, a dynamic adaptive compiler of the JVM process cannot directly inline the write barrier code with all operations that store object pointers into objects. Rather, the dynamic adaptive compiler would need to generate, and inline with each object pointer store operation, a set of executable code that first determines whether an object pointer is being stored in a young or an old generation object, and then branches into the write barrier code if the operation is being performed in an old generation object. Thus, when performing an operation to store an object pointer in an object, in this operational context the JVM process may need to perform at least one memory accessing operation (to determine the type of the object into which an object pointer is being stored), and possibly a branching operation (if the write barrier code needs to be performed). Performing a lot of memory accessing and/or branching operations, however, may hinder the execution performance of the JVM process. The JVM process or a bytecode interpreter thereof would encounter a similar issue when interpretively executing the bytecodes of operations that store object pointers into objects.

To address this issue, in one example embodiment a JVM process provides a fixed offset for storing write barrier code into the chunks of a chunked object heap. According to the techniques described herein, each chunk would include a portion for storing write barrier code, where the portion begins at the fixed offset within the range of virtual memory address allocated to that chunk by the JVM process (or by a component thereof). In this way, the JVM process (or a component thereof such as a dynamic adaptive compiler) would have a fixed, known location in each chunk where the write barrier code specific to that chunk is stored. When the JVM process or a component thereof executes an operation to store a pointer into a particular object that is stored in a particular chunk, the write barrier code may be invoked based on the fixed offset without first determining whether the particular chunk is configured for storing young or old generation objects.

In this example embodiment, the write barrier code for a chunk storing young generation objects may be a single return instruction. The write barrier code for a chunk storing old generation objects may be a set of executable instructions which, when executed, is operable to locate and mark a corresponding entry in a side data structure associated with the chunk. (The side data structure associated with the chunk may also be stored at some known, predetermined offset within the chunk). The write barrier code for any particular chunk is stored at the same fixed, known offset within that particular chunk regardless of whether the chunk is configured for storing old or young generation objects.

According to the techniques described herein, when a dynamic adaptive compiler of the JVM process is compiling an operation that stores an object pointer into a particular object in a particular chunk, the dynamic adaptive compiler generates code that includes a call to the write barrier code. When executed, this generated code would first determine the base address of the particular chunk (e.g. by zeroing out the lower order bits of the virtual memory address at which the object pointer is being stored). Then, the generated code would add this base address to the fixed offset (at which write barrier code is stored in any chunk) in order to determine the virtual memory address at which the write barrier code for the particular chunk is located. The generated code would then call the write barrier code at the determined virtual memory address, which would be a virtual address in the particular chunk.

When the JVM process or a component thereof executes the executable code for the operation that stores the object pointer into the particular object in the particular chunk, the JVM process or the component thereof would execute the code generated by the dynamic adaptive compiler in order to invoke the write barrier code stored in that particular chunk. If the particular chunk happens to store young generation objects, then the write barrier code would be a single return instruction that would be executed immediately and would return execution control to the JVM or the component thereof. If the particular chunk happens to store old generation objects, then the write barrier code would be a set of executable instructions which, when executed, would locate and mark a corresponding entry in a side data structure associated with that particular chunk. When the write barrier code completes execution, it would return execution control to the JVM or the component thereof.

Similarly, when a bytecode interpreter of the JVM process is interpreting (e.g. from the source code of a Java application) an operation that stores an object pointer into a particular object in a particular chunk, the bytecode interpreter would execute a call to the write barrier code stored in that particular chunk. For example, the bytecode interpreter would first determine the base address of the particular chunk (e.g. by zeroing out the lower order bits of the virtual memory address at which the object pointer is being stored). Then, the bytecode interpreter would add this base address to the fixed offset (at which write barrier code is stored in any chunk) in order to determine the virtual memory address at which the write barrier code for the particular chunk is located. The bytecode interpreter would then invoke the write barrier code in the particular chunk based on the determined virtual memory address. If the particular chunk happens to store young generation objects, then the write barrier code would be a single return instruction which would immediately return execution control to the bytecode interpreter. If the particular chunk happens to store old generation objects, then the write barrier code would be a set of executable instructions which would locate and mark a corresponding entry in a side data structure associated with that particular chunk, and thereafter would return execution control to the bytecode interpreter.

In some embodiments, a set of executable instructions stored at a fixed offset within a chunk may be changed during the lifetime of that chunk. For example, a chunk configured for storing young generation objects may be changed in its entirety to a chunk storing old generation objects. This may happen when a JVM process or component thereof determines that it is more efficient to promote to the old generation all or a large number of the young generation objects stored in the chunk instead of copying these objects out. (For instance, it may be more efficient to garbage collect the few dead objects from the chunk and then change the type of the chunk to old generation instead of allocating a new chunk, designating it an old generation chunk, and then copying the alive objects into the new chunk.) In this example, when the type of the chunk is changed to old generation, the JVM process (or a component thereof such as a dynamic adaptive compiler) would generate the write barrier code specific to this chunk, and would store the generated write barrier code at the fixed offset within the chunk (thus replacing the write barrier code previously stored therein). In this way, the techniques described herein provide for a chunked heap utilization that is truly dynamic.

VI. Hardware Overview

Figure 7:
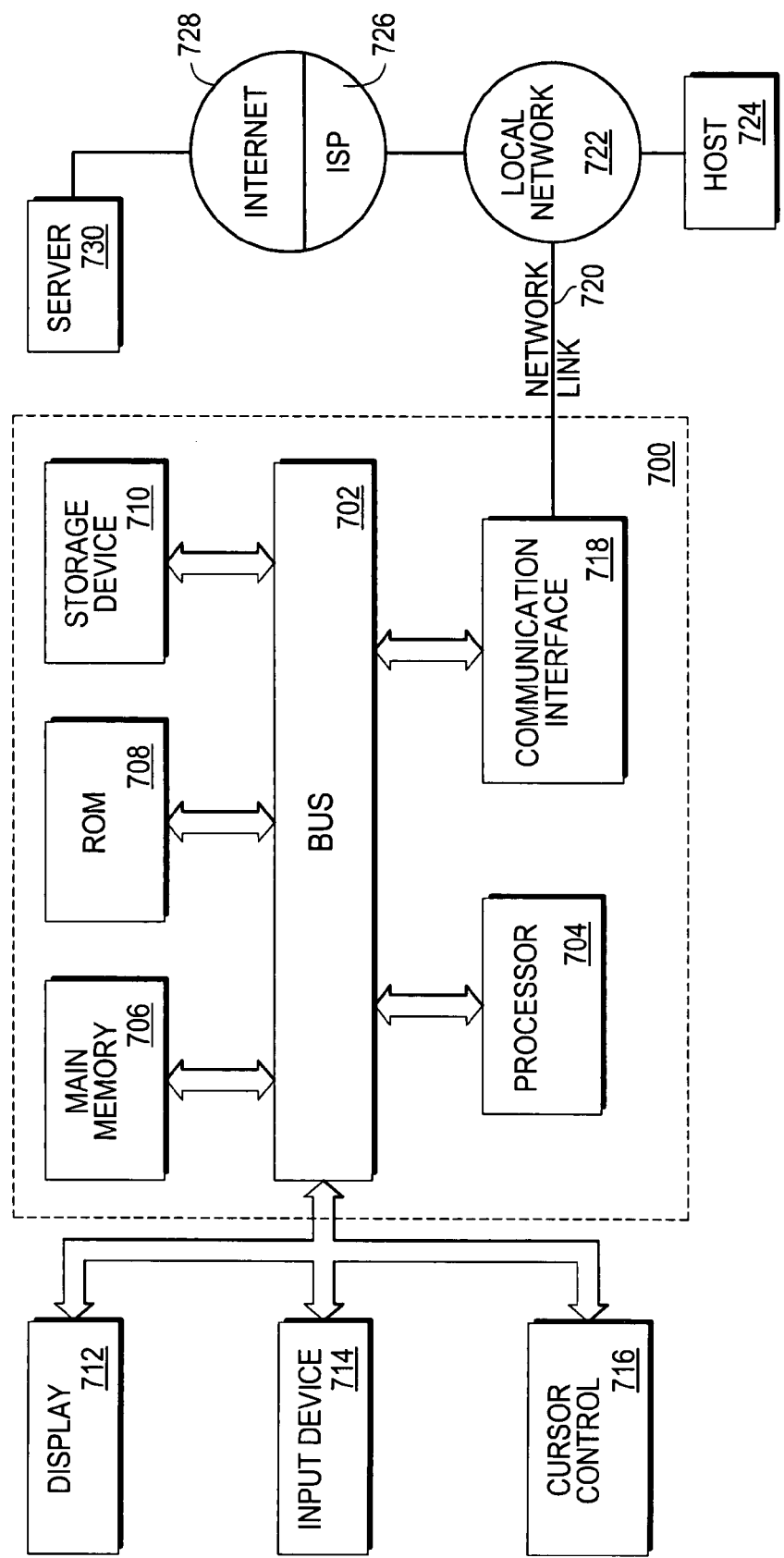
FIG. 7 is a block diagram that illustrates a computer system upon which an embodiment may be implemented.

FIG. 7 is a block diagram that illustrates a computer system upon which an embodiment of the techniques described herein may be implemented. Computer system 700 includes a bus 702 for facilitating information exchange, and one or more processors 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions by processor 704. Computer system 700 may further include a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712 for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

In computer system 700, bus 702 may be any mechanism and/or medium that enable information, signals, data, etc., to be exchanged between the various components. For example, bus 702 may be a set of conductors that carries electrical signals. Bus 702 may also be a wireless medium (e.g. air) that carries wireless signals between one or more of the components. Bus 702 may further be a network connection that connects one or more of the components. Any mechanism and/or medium that enable information, signals, data, etc., to be exchanged between the various components may be used as bus 702.

Bus 702 may also be a combination of these mechanisms/media. For example, processor 704 may communicate with storage device 710 wirelessly. In such a case, the bus 702, from the standpoint of processor 704 and storage device 710, would be a wireless medium, such as air. Further, processor 704 may communicate with ROM 708 capacitively. Further, processor 704 may communicate with main memory 706 via a network connection. In this case, the bus 702 would be the network connection. Further, processor 704 may communicate with display 712 via a set of conductors. In this instance, the bus 702 would be the set of conductors. Thus, depending upon how the various components communicate with each other, bus 702 may take on different forms. Bus 702, as shown in FIG. 7, functionally represents all of the mechanisms and/or media that enable information, signals, data, etc., to be exchanged between the various components.

The invention is related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other physical medium from which a computer can read.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other physical medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to specific embodiments, it should not be construed to be so limited. Various modifications may be made by those of ordinary skill in the art with the benefit of this disclosure without departing from the spirit of the invention. These and other modifications are within the scope of the present invention. Thus, the invention should not be limited by the specific embodiments used to illustrate it but only by the scope of the issued claims and the equivalents thereof.

What is claimed is:

1. A machine-implemented method, comprising:
   allocating a first range of virtual memory addresses to be used for a first chunk of a heap;
   allocating a second range of virtual memory addresses to be used for a second chunk of the heap, wherein the first and the second ranges of virtual memory addresses are not contiguous;
   storing a side data structure in a portion of the second chunk, wherein the side data structure begins at a predetermined offset within the second range of virtual memory addresses, and wherein the side data structure comprises a plurality of entries with each entry associated with a corresponding section of the second chunk; and
   locating a particular entry in the side data structure corresponding to a particular section of the second chunk without performing any memory accessing operations to obtain an indirect reference to the side data structure, wherein locating the particular entry comprises:
   determining a base address of the second chunk by zeroing out a predetermined set of low order bits of a particular virtual address within the particular section of the second chunk;
   scaling a value indicated in the set of low order bits of the particular virtual address to determine an index into the side data structure, wherein the index identifies the particular entry which corresponds to the particular section of the second chunk; and
   determining a virtual address of the particular entry by adding the base address of the second chunk, the predetermined offset, and the index that identifies the particular entry within the side data structure.

2. The method of claim 1, wherein the side data structure stored in the second chunk is any one of:
   a marking bitmap associated with a plurality of sections in the second chunk, wherein each section in the plurality of section is sized to the minimum size of objects stored in the second chunk;
   a cardmark array associated with a plurality of sections in the second chunk, wherein the plurality of sections are a plurality of equal-sized cards; and
   a block offset table associated with objects stored in the second chunk.

3. The method of claim 1, wherein locating the particular entry in the side data structure comprises performing one or more operations, wherein each of the one or more operations comprises processor instructions that include only operands which are stored in registers.

4. The method of claim 1, wherein:
   the heap is an object heap configured for storing objects; and
   the object heap comprises a plurality of equal-sized chunks that include the first and the second chunks.

5. The method of claim 1, wherein:
   the method is performed during runtime by a Java Virtual Machine (JVM) process; and
   the heap is an object heap that is configured to store Java objects.

6. The method of claim 5, further comprising:
   storing a set of Java objects in the second chunk, wherein the set of Java objects is designated as an old generation of objects.

7. The method of claim 6, further comprising:
   storing an object pointer at the particular virtual address within a particular Java object of the set of Java objects, wherein storing the object pointer comprises executing write barrier code.

8. The method of claim 7, wherein the write barrier code, when executed, causes locating the particular entry in the side data structure.

9. The method of claim 8, wherein the write barrier code, when executed, further causes marking the particular entry to indicate that the object pointer has been stored at the particular virtual address in the particular Java object.

10. The method of claim 9, further comprising:
    performing garbage collection over the set of Java objects stored in the second chunk, wherein performing the garbage collection comprises accessing the side data structure.

11. A machine-readable storage medium, comprising:
    instructions for causing one or more processors to allocate a first range of virtual memory addresses to be used for a first chunk of a heap;
    instructions for causing one or more processors to allocate a second range of virtual memory addresses to be used for a second chunk of the heap, wherein the first and the second ranges of virtual memory addresses are not contiguous;
    instructions for causing one or more processors to store a side data structure in a portion of the second chunk, wherein the side data structure begins at a predetermined offset within the second range of virtual memory addresses, and wherein the side data structure comprises a plurality of entries with each entry associated with a corresponding section of the second chunk; and
    instructions for causing one or more processors to locate a particular entry in the side data structure corresponding to a particular section of the second chunk without performing any memory accessing operations to obtain an indirect reference to the side data structure, wherein the instructions for causing one or more processors to locate the particular entry comprise:
    instructions for causing one or more processors to determine a base address of the second chunk by zeroing out a predetermined set of low order bits of a particular virtual address within the particular section of the second chunk;
    instructions for causing one or more processors to scale a value indicated in the set of low order bits of the particular virtual address to determine an index into the side data structure, wherein the index identifies the particular entry which corresponds to the particular section of the second chunk; and instructions for causing one or more processors to determine a virtual address of the particular entry by adding the base address of the second chunk, the predetermined offset, and the index that identifies the particular entry within the side data structure.

12. The machine-readable storage medium of claim 11, wherein the side data structure stored in the second chunk is any one of:

a marketing bitmap associated with a plurality of sections in the second chunk, wherein each section in the plurality of sections is sized to the minimum size of objects stored in the second chunk;

a cardmark array associated with a plurality of sections in the second chunk, wherein the plurality of sections are a plurality of equal-sized cards; and a block offset table associated with objects stored in the second chunk.

13. The machine-readable storage medium of claim 11, wherein the instructions for causing one or more processors to locate the particular entry in the side data structure further comprise instructions for causing one or more processors to perform one or more operations, wherein each of the one or more operations comprises processor instructions that include only operands which are stored in registers.

14. The machine-readable storage medium of claim 11, wherein:

the heap is an object heap configured for storing objects; and the object heap comprises a plurality of equal-sized chunks that include the first and the second chunks.

15. The machine-readable storage medium of claim 11, further comprising:

instructions for causing one or more processors to execute a Java Virtual Machine (JVM) process, wherein the instructions for causing one or more processors to execute the JVM process comprise the instructions for causing one or more processors to allocate the first and the second ranges of virtual memory addresses;

wherein the heap is an object heap that is configured to store Java objects.

16. The machine-readable storage medium of claim 15, further comprising:

instructions for causing one or more processors to store a set of Java objects in the second chunk, wherein the set of Java objects is designated as an old generation of objects.

17. The machine-readable storage medium of claim 16, further comprising:

instructions for causing one or more processors to store an object pointer at the particular virtual address within a particular Java object of the set of Java objects, wherein storing the object pointer comprises executing write barrier code.

18. The machine-readable storage medium of claim 17, wherein the write barrier code includes the instructions for causing one or more processors to locate the particular entry in the side data structure.

19. The machine-readable storage medium of claim 18, wherein the write barrier code further comprises instructions for causing one or more processors to mark the particular entry to indicate that the object pointer has been stored at the particular virtual address in the particular Java object.

20. The machine-readable storage medium of claim 19, further comprising:

instructions for causing one or more processors to perform garbage collection over the set of Java objects stored in the second chunk, wherein the instructions for causing one or more processors to perform the garbage collection comprise instructions for causing one or more processors to access the side data structure.

* * * * *

UNITED STATES PATENT AND TRADEMARK OFFICE
CERTIFICATE OF CORRECTION

PATENT NO. : 7,716,449 B2  Page 1 of 1
APPLICATION NO. : 11/827940
DATED : May 11, 2010
INVENTOR(S) : Peter B. Kessler It is certified that error appears in the above-identified patent and that said Letters Patent is hereby corrected as shown below:

In column 20, line 18-25, below "can read." delete "Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other physical medium from which a computer can read.".

Signed and Sealed this
Twenty-sixth Day of July, 2011

David J. Kappos
*Director of the United States Patent and Trademark Office*